(12) United States Patent
Codina et al.

(10) Patent No.: US 12,053,845 B2
(45) Date of Patent: Aug. 6, 2024

(54) WELDING ELECTRICAL CONTROL SYSTEM, APPARATUS, AND METHOD

(71) Applicant: WWW SOLUTIONS LLC, San Juan, PR (US)

(72) Inventors: Francisco J. Codina, Hialeah, FL (US); Francisco J. Codina, San Juan, OR (US)

(73) Assignee: WWW SOLUTIONS LLC, San Juan, PR (US)

( * ) Notice: Subject to any disclaimer, the term of this patent is extended or adjusted under 35 U.S.C. 154(b) by 253 days.

(21) Appl. No.: 16/983,058

(22) Filed: Aug. 3, 2020

(65) Prior Publication Data

US 2021/0346971 A1    Nov. 11, 2021

Related U.S. Application Data

(60) Provisional application No. 63/020,481, filed on May 5, 2020.

(51) Int. Cl.
*B23K 9/10* (2006.01)
*B23K 9/095* (2006.01)

(52) U.S. Cl.
CPC .......... *B23K 9/1012* (2013.01); *B23K 9/0953* (2013.01); *B23K 9/1043* (2013.01); *B23K 9/1087* (2013.01)

(58) Field of Classification Search
CPC .. B23K 37/006; B23K 9/0953; B23K 9/1006; B23K 9/1012; B23K 9/1043; B23K 9/1087
See application file for complete search history.

(56) References Cited

U.S. PATENT DOCUMENTS 2,078,690 A    4/1937    Schueler
2,170,861 A    8/1939    Hobart
(Continued)

FOREIGN PATENT DOCUMENTS

CN    109434250 A  *  3/2019 ........... B23K 9/1043
JP    5090760 B2  *  12/2012

OTHER PUBLICATIONS

Machine translation of CN109434250: Li, A no-load energy-saving device for a DC electric welding machine, 2019 (Year: 2019).*

(Continued)

*Primary Examiner* — Janie M Loeppke
*Assistant Examiner* — Abigail H Rhue
(74) *Attorney, Agent, or Firm* — McCarter & English, LLP; James M. Smedley; Alex Korona

(57) ABSTRACT

An apparatus is disclosed. The apparatus has a power supply, a control device connected to the power supply, a welding device selectively connected to the power supply via the control device, and a switch connected between the control device and the welding device. The control device includes a time delay relay that measures a predetermined time period. The switch maintains a closed position when the predetermined time period expires and the welding device is producing a welding arc. The switch switches from the closed position to an open position when the predetermined time period expires and the welding device stops producing the welding arc. The control device transfers current from the power supply to the welding device when the switch is in the closed position, and blocks current from the power supply to the welding device when the switch is in the open position.

20 Claims, 3 Drawing Sheets

(56) References Cited

U.S. PATENT DOCUMENTS

| | | | |
|---|---|---|---|
| 2,297,841 A | 10/1942 | MacKenzie | |
| 2,427,127 A | 9/1947 | Dysart | |
| 2,499,635 A | 3/1950 | Ferguson | |
| 2,734,116 A | 2/1956 | Rybolt | |
| 3,575,572 A | 4/1971 | Levinge | |
| 3,748,561 A | 7/1973 | Williams | |
| 6,624,388 B1* | 9/2003 | Blankenship | B23K 11/252 |
| | | | 700/145 |
| 7,978,036 B2* | 7/2011 | Adunka | H01H 3/001 |
| | | | 335/8 |
| 9,820,614 B1* | 11/2017 | Dingler | B30B 15/28 |
| 10,158,199 B2 | 12/2018 | Siegler | |
| 10,239,147 B2 | 3/2019 | Denis | |
| 2005/0051526 A1* | 3/2005 | Potts | B23K 37/006 |
| | | | 219/132 |
| 2012/0298644 A1 | 11/2012 | Lambert et al. | |
| 2016/0129521 A1* | 5/2016 | Wiryadinata | B23K 9/1006 |
| | | | 219/130.21 |
| 2018/0071850 A1 | 3/2018 | Kooken | |
| 2018/0214968 A1* | 8/2018 | Peters | B23K 9/092 |
| 2021/0129250 A1* | 5/2021 | Vogel | B23K 9/0731 |

OTHER PUBLICATIONS

Machine translation of JP-5090760 : Adachi, a welding torch and an arc start method of robot arc welding, 2012 (Year: 2012).*
The Welding Journal, 1945—Safety Control for Arc Welders Eliminates Shock—Mahumed—Herbert pp. 638-639 (via Google Books).
Extended European Search Report, Supplementary European Search Report and European Search Opinion, dated May 23, 2024, issued in corresponding European Application No. 21800605.4.

* cited by examiner

WELDING ELECTRICAL CONTROL SYSTEM, APPARATUS, AND METHOD

CROSS-REFERENCE TO RELATED APPLICATIONS

This application claims priority to U.S. provisional patent application 63/020,481 filed on May 5, 2020, and entitled "Welding Electrical Control," the entire disclosure of which is incorporated herein by reference.

TECHNICAL FIELD

Various embodiments relate generally to a control system, apparatus, and method, and more particularly, to a welding electrical control system, apparatus, and method.

BACKGROUND

Welding joins materials based on a welding process that fuses or joins the materials using high temperatures to melt those materials. Electrical welding equipment used in industries and activities such as construction, manufacturing, and repair may generate high temperatures using various energy sources, with electrical welding equipment consuming a relatively large amount of electrical energy.

A human operator of welding equipment may be a skilled artisan known as a welder. A welder may weld materials using various techniques employing a welding torch or welding gun powered by the welding equipment to heat the materials being joined.

As a welder works, the welder may move the welding torch or welding gun between work locations, or reposition the torch or gun to access various items to be welded. In some scenarios such as manufacturing, welding equipment may be powered continuously for extended time periods, even when a welder is not welding. When a welder is not welding, whether moving between work items, or between shifts, the welding equipment may remain powered. In extended use scenarios, welding equipment may remain powered while different welders intermittently operate the welding equipment during scheduled shifts worked around the clock. A business operating welding equipment may experience substantial excess costs for the electric power consumed by welding equipment when a welder is not actively welding, or between scheduled shifts.

Conventional welding power control devices that control power to a welding gun based on the operating state of the welding gun have limitations. For example, some welding power control devices may reduce power when the welding equipment is idle, but may not disconnect or completely disconnect power. Such a welding electric power control implementation may result, for example, in increased risk to the safety of the equipment operator, as a result of reducing, but not disconnecting or completely disconnecting, power to the welding equipment when the welding equipment is not welding. In an illustrative example, a welding electric power control design that reduces, but does not disconnect or completely disconnect, welding equipment power when the welding equipment is idle, may result in energy wasted by the welding equipment while the welding equipment continues to be powered at a reduced level, e.g. while the welding equipment is idle.

For example, U.S. Pat. No. 2,170,861, entitled "Electric Apparatus Power Saver," describes welding power control that automatically starts and stops welding equipment upon the suspension or resumption of welding activity, based on reducing welding equipment power when the welding equipment is idle. However, U.S. Pat. No. 2,170,861 does not, for example, appear to disclose completely disconnecting welding electric power when the welding equipment is not welding, reconnecting welding equipment electric power when the welding equipment is touched to a work piece to be welded, and maintaining welding electric power to the welding equipment while the welder is welding, based on current passing through the welding equipment to the work piece.

Also for example, U.S. Pat. No. 2,499,635, entitled "Automatic self-starting and stopping system for arc welding installations," describes welding power control that automatically starts and stops systems for welding installations, reducing welding equipment power when the welding equipment is idle, and permitting a welder to resume operation by touching the welding equipment to the workpiece. However, U.S. Pat. No. 2,499,635 does not, for example, appear to disclose completely disconnecting welding electric power when the welding equipment is not welding, reconnecting welding equipment electric power when the welding equipment is touched to a work piece to be welded, and maintaining welding electric power to the welding equipment while the welder is welding, based on current through the welding equipment to the work piece.

Further for example, U.S. Pat. No. 3,748,561, entitled "Remote starting control circuit for welder power supply," describes welding power control that reduces welding equipment power when the welding equipment is idle, permits remotely starting welding equipment to resume power for a predetermined time, and restarting the equipment in response to contact between the welding equipment and workpiece. However, U.S. Pat. No. 3,748,561 does not, for example, appear to disclose completely disconnecting welding electric power when the welding equipment is not welding, reconnecting welding equipment electric power when the welding equipment is touched to a work piece to be welded, and maintaining welding electric power to the welding equipment while the welder is welding, based on current through the welding equipment to the work piece.

The exemplary disclosed system, apparatus, and method are directed to overcoming one or more of the shortcomings set forth above and/or other deficiencies in existing technology.

SUMMARY

In one exemplary aspect, the present disclosure is directed to an apparatus. The apparatus includes a power supply, a control device connected to the power supply, a welding device selectively connected to the power supply via the control device, and a switch connected between the control device and the welding device. The control device includes a time delay relay that measures a predetermined time period. The switch maintains a closed position when the predetermined time period expires and the welding device is producing a welding arc. The switch switches from the closed position to an open position when the predetermined time period expires and the welding device stops producing the welding arc. The control device transfers current from the power supply to the welding device when the switch is in the closed position, and blocks current from the power supply to the welding device when the switch is in the open position.

In another exemplary aspect, the present disclosure is directed to a method. The method includes providing a power supply and a welding device, disposing a control device electrically between the power supply and the welding device, disposing a switch between the control device and the welding device, and measuring a predetermined time period with the control device. The method also includes maintaining the switch in a closed position when the predetermined time period expires and the welding device is producing a welding arc, switching the switch from the closed position to an open position when the predetermined time period expires and the welding device stops producing the welding arc, transferring current from the power supply to the welding device, via the control device, when the switch is closed, and blocking current from the power supply to the welding device, via the control device, when the switch is in the open position.

BRIEF DESCRIPTION OF THE DRAWINGS

Like reference symbols in the various drawings indicate like elements.

DETAILED DESCRIPTION AND INDUSTRIAL APPLICABILITY

Figure 1:
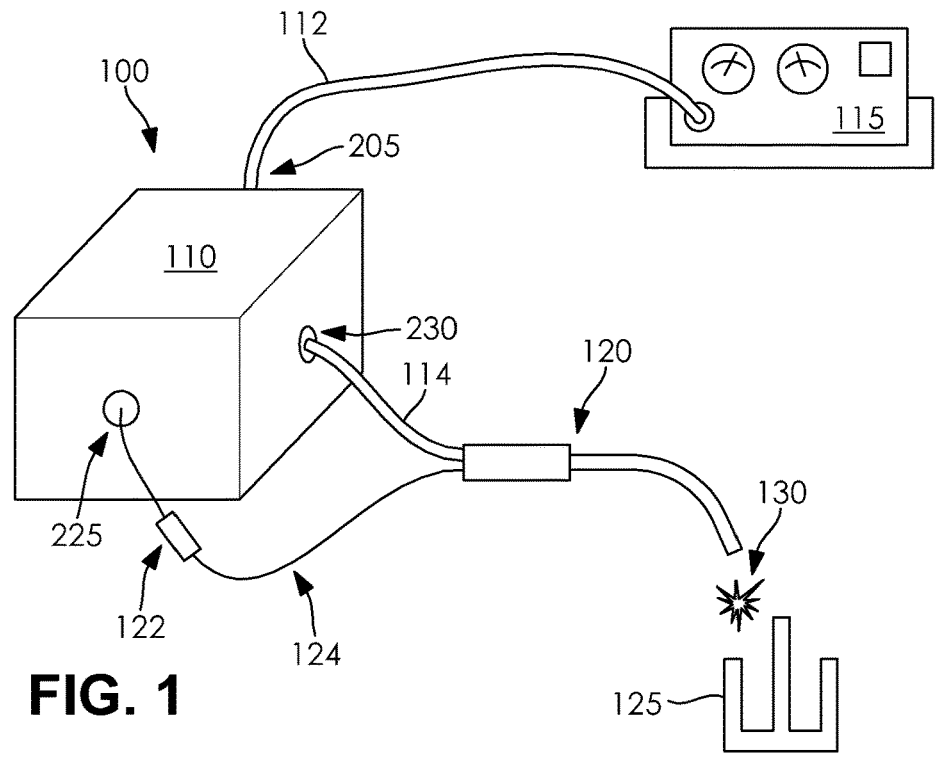
FIG. 1 illustrates a schematic view of an exemplary disclosed system of at least some exemplary embodiments of the present disclosure.

The exemplary disclosed system, apparatus, and method may be an operational welding electric control system configured to conserve welding electric power, reduce welding cost, and improve welding safety, based on disconnecting welding equipment power to a welding gun when the welding gun is idle, and automatically reconnecting power to the welding gun for example when the unpowered welding gun is tapped against a work piece to be welded (e.g., in response to current sensed in a magnetic switch magnetically engaged with the work piece). FIG. 1 illustrates an exemplary system 100. System 100 may include a control device such as a welding electric control device (e.g., welding electric control 110), a power supply such as welding power supply 115, and a welding device such as welding gun 120. Welding electric control 110 may control an operation of welding gun 120, and welding power supply 115 may power system 100.

Welding power supply 115 may be any suitable power supply for powering system 100. For example, welding power supply 115 may be any suitable AC or DC power source for powering system 100. In at least some exemplary embodiments, welding power supply 115 may include a DC generator, a DC inverter, an AC transformer, an AC/DC transformer rectifier, and/or a DC rectifier. For example, welding power supply 115 may include electrical power sources, engines, motors, batteries, and/or any other desired power components or sources.

Welding gun 120 may be any suitable component (e.g., a gun or a torch) for welding materials. As illustrated in FIG. 1, welding gun 120 may weld a work piece 125 via an arc 130. For example, welding gun 120 may be a welding gun or torch for use in plasma arc welding, gas metal arc welding, gas tungsten-arc welding, shielded metal arc welding, atomic hydrogen welding, flux-cored arc welding, and/or energy beam welding. Welding gun 120 may include any suitable type of gun or torch such as an injector-type torch or a positive-pressure type torch. Welding gun 120 may include any suitable low-pressure or medium-pressure type torch or gun. In at least some exemplary embodiments, welding gun 120 may be an Oxy-Acetylene Welding torch, brazing torch, propane torch, or Mapp gas torch.

Figure 2:
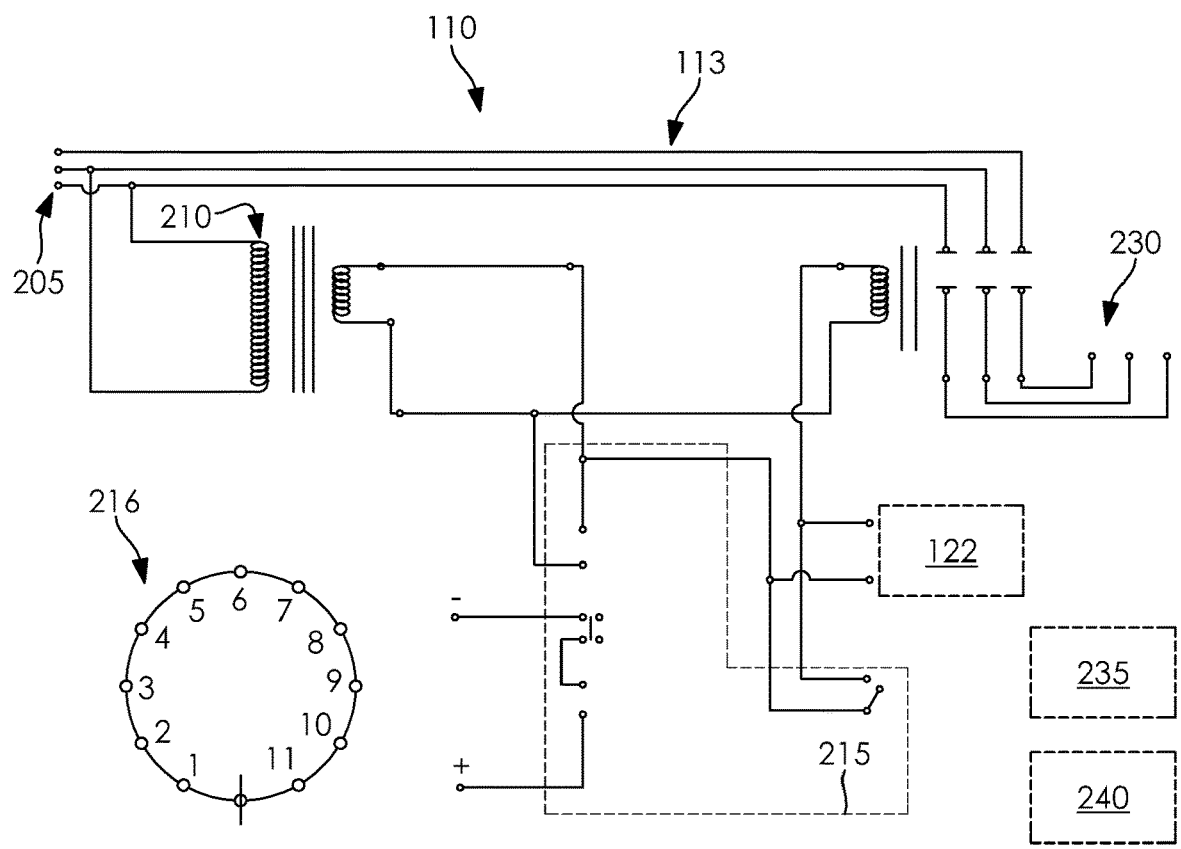
FIG. 2 illustrates a schematic view of an exemplary disclosed system of at least some exemplary embodiments of the present disclosure.

FIG. 2 illustrates a schematic view of exemplary disclosed welding electric control 110. Welding electric control 110 may be configured to conserve welding electric power, reduce welding cost, and improve welding safety, for example based on disconnecting welding equipment power to welding gun 120 when welding gun 120 is idle, and automatically reconnecting power to welding gun 120 when unpowered welding gun 120 is tapped (e.g., by a user) against work piece 125 to be welded via arc 130. Power may be connected and disconnected based on (e.g., in response to) current sensed in an exemplary disclosed magnetic switch magnetically engaged with work piece 125.

As illustrated in FIG. 2, exemplary disclosed welding electric control 110 may include a power input 205 connected to a transformer 210. In at least some exemplary embodiments, transformer 210 may be a three-phase step-down transformer configured to transform 480 VAC to a 120 VAC supply (e.g., or any other suitable level of VAC) connected to a time delay relay 215, a contactor 220, a current sensor input 225, and a power output 230. Also in at least some exemplary embodiments, transformer 210 may be a single-phase transformer. The tap voltages illustrated in FIG. 2 regarding transformer 210 are exemplary. Any other suitable voltages may also be used with transformer 210 and/or other components of system 100. Time delay relay 215 may be any suitable switch or relay (e.g., electrical switch or relay) for operating with components of welding electrical control 110. For example, time delay relay 215 may be a digital solid state relay, a motor-driven relay, an analog solid state relay, or a thermostatic relay. Contactor 220 may be any suitable electrical component for controlling (e.g., turning on and off) the exemplary disclosing circuit. For example, contactor 220 may include a coil or electromagnet. Contactor 220 may for example be a manual controller, a magnetic contactor, or a knife blade switch. Current sensor input 225 may be any suitable component for being electrically connected to and/or receiving input from the exemplary disclosed magnetic switch. Power output 230 may be any suitable electrical component for being electrically connected to welding gun 120 and selectively providing or connecting power or current to welding gun 120 from power input 205. For example, contactor 220 may operate to selectively electrically connect and disconnect power input 205 and power output 230.

As illustrated in FIG. 2, time delay relay 215 may be controlled (e.g., be adjustable) to selectively turn off power output 230 by disconnecting contactor 220 after a variable period of time or based on any other suitable criteria. Contactor 220 may include a coil that may be a single-phase coil. Also for example, contactor 220 may be a multiple-phase contactor.

As illustrated in FIG. 2, power output 230 may also be turned on when current is connected through current sensor input 225. Current may be connected through current sensor input 225, for example, by a welder tapping welding gun 120, which may be connected to current sensor input 225, to a surface. For example, current sensor input 225 may be connected to a switch such as a magnetic switch 122 that may be disposed or positioned in a control input connection to welding electric control 110. Magnetic switch 122 may be any suitable type of magnetic switch that may operate with other components of system 100. For example, magnetic switch 122 may be a coded switch, a reed switch, a transistor switch, a Triac switch, or a Hall effect switch. For example, magnetic switch 122 may be configured or disposed in or on a connector 124 that may be a cable or wiring connected to a control input (e.g., current sensor input 225) of welding electric control 110. Connector 124 may be a control input cable that may be connected between welding gun 120 and a control input (e.g., current sensor input 225) of welding electric control 110, to automatically control (e.g., govern) welding electric power in response to current sensed by welding electric control 110 in magnetic switch 122. Switch 122, which may be configured in connector 124 connected to the control input (e.g., current sensor input 225) of welding electric control 110, may be positioned close to the welding electrical control 110 relative to a length of a connection between welding gun 120 and welding electric control 110. Positioning magnetic switch 122 relatively close to welding electric control 110 may optimize magnetic contact switching efficiency and performance as a result of minimizing potentially disadvantageous resistive and parasitic inductive effects due to excess cable (e.g., excess cable of connector 124 or any other suitable cable of system 100) between magnetic switch 122 and the contactor coil of contactor 220. For example as described herein, switch 122 may move or switch from an open position to a closed position based on an operation of system 100.

For example, switch 122 may be connected to current sensor input 225, and may control (e.g., automatically govern) welding electric power in response to current sensed by welding electric control 110 in magnetic switch 122 (e.g., that may be connected to current sensor input 225). While a user of system 100 such as a welder continues welding, switch 122 and welding electric control 110 maintain current through contactor 220 (e.g., the coil of contactor 220) after a timer 216 (e.g., as illustrated in FIG. 2) of time delay relay 215 expires, maintaining power (e.g., keeping power on) to welding gun 120. For example, power to welding gun 120 may be maintained by system 100 before timer 216 expires, and then power may be continued to be maintained by system 100 while a welder continues to weld. As illustrated in FIGS. 1 and 2, power may be transferred from welding power supply 115 to power input 205 of welding electric control 110 via a connector 112, from power input 205 to power output 230 via a connector 113, and from power output 230 to welding gun 120 via a connector 114, when current is maintained through contactor 220 (e.g., the coil of contactor 220). Connectors 112, 113, 114, and 124 may be any suitable connector for transferring electrical current such as a wire (e.g., copper wire), cable, and/or any other suitable electrical connector.

In at least some exemplary embodiments, time delay relay 215 may be configured to connect welding electric power to welding gun 120 when magnetic switch 122 closes. For example, time delay relay 215 may be configured to disconnect power after a predetermined period of time, for example, one minute or any other desired time period if a welder is no longer welding (e.g., a few seconds, less than a minute, a few minutes, or any other desired time period, for example). For example, magnetic switch 122 may be engaged magnetically with the work (e.g., work piece 125), creating a magnetic field. In at least some exemplary embodiments, magnetic switch 122 may operate as a current sensor. For example, while a user such as a welder is welding with welding gun 120, arc current of arc 130 through the welding electrode (e.g., of welding gun 120) to the work (e.g., work piece 125) creates the magnetic field, keeping magnetic switch 122 closed. For example, while the user continues welding, the arc current of arc 130 creates the magnetic field maintaining (e.g., keeping on) current through the contactor coil of contactor 220, even after timer 216 of time delay relay 215 expires (e.g., after a predetermined time period expires). When the user such as a welder stops welding, the arc current of arc 130 stops, and magnetic switch 122 opens (e.g., magnetic switch is in an open position), switching current through the contactor coil of contactor 220 off, and disconnecting electric power from welding gun 120.

Alternatively to being a magnetic switch, switch 122 may be any other suitable type of switch or relay that operates based on whether or not welding gun 120 is operating to produce arc 130. For example in at least some exemplary embodiments, switch 122 may be a thermal switch that operates based on whether or not arc 130 is emitting heat, an optical switch that operates based on whether or not arc 130 is emitting light, and/or any other suitable switch that operates based on a presence or an absence of arc 130.

As illustrated in FIG. 2, time delay relay 215 may be configured to connect welding electric power (e.g., welding power supply 115) to power output 230 when magnetic switch 122 connected to current sensor input 225 closes. For example, time delay relay 215 may be configured to disconnect power from power output 230 after a predetermined period of time and/or any other desired criteria (e.g., user input). Magnetic switch 122 connected to current sensor input 225 may be engaged magnetically with the work (e.g., work piece 125), creating a magnetic field. For example, magnetic switch 122 may operate as a current sensor connected to current sensor input 225. While a user such as a welder is welding with welding gun 120 connected to power output 230, the arc current of arc 130 (e.g., through the welding electrode) to the work (e.g., work piece 125) creates a magnetic field, keeping magnetic switch 122, which may be connected to current sensor input 225, closed. For example, while the welder continues welding, the arc current of arc 130 creates the magnetic field maintaining current through contactor 220 (e.g., maintaining the current through the coil of contactor 220 on), for example even after timer 216 of time delay relay 215 expires. When the welder stops welding, the arc current of arc 130 stops, and magnetic switch 122 connected to current sensor input 225 opens (e.g., magnetic switch is in an open position), switching current through contactor 220 off, and disconnecting current transfer from power output 230 to welding gun 120 (e.g., based on an operation of contactor 220).

In at least some exemplary embodiments, when a user such as a welder has stopped welding and welding electric control 110 has disconnected power output 230 from welding gun 120 (e.g., via an operation of contactor 220), the welder may tap an electrode of welding gun 120 to a work piece surface (e.g., of work piece 125) to be welded, causing magnetic switch 122 connected to current sensor input 225 to close. For example when magnetic switch 122 connected to current sensor input 225 closes, time delay relay 215 reconnects power output 230 to welding gun 120 by energizing contactor 220 (e.g., by energizing the coil of contactor 220).

Welding electric control 110 may be an alternating current welding electric control design. Also for example, welding electric control 110 may be a direct current welding electric control design. For example in a direct current exemplary embodiment, time delay relay 215 and contactor 220 may be direct current components (e.g., direct current equivalent components), and power input 205 and transformer 210 may be single-phase operation components.

Welding electric control 110 may be connected to welding power supply 115 and welding gun 120 to control (e.g., automatically govern) electric power to welding gun 120 in response to current in magnetic switch 122 sensed in current sensor input 225. For example in at least some exemplary embodiments, current of arc 130 between welding gun 120 and work piece 125 causes magnetic switch 122 to remain closed while a user such as a welder is welding. For example in at least some exemplary embodiments, current of arc 130 between welding gun 120 and work piece 125 is sensed by welding electric control 110 in current sensor input 225, causing welding electric control 110 to maintain connection of power input 205 to welding gun 120, via contactor 220 and power output 230.

System 100 (e.g., welding electric control 110) may include any suitable controller components for controlling an operation of system 100. For example as illustrated in FIG. 2, controller 235 may control an operation of system 100. Controller 235 may be integrated into welding electric control 110 and/or any other suitable components of system 100. Controller 235 may include for example a microprocessing logic control device or board components. Also for example, controller 235 may include input/output arrangements that allow it to be connected (e.g., via wireless and/or electrical connection) to other components of system 100. Also for example, controller 325 (e.g., and other components of system 300) may communicate via Bluetooth (e.g., including the Bluetooth Low Energy or BLE standard), Wi-Fi network, Global System for mobiles (GSM), narrow band (e.g., narrow band IoT such as LTE Cat1, LTE-M, NB-IoT), networks such as 2G, 3G, 4G, 5G and/or any other suitable communication technique.

Figure 3:
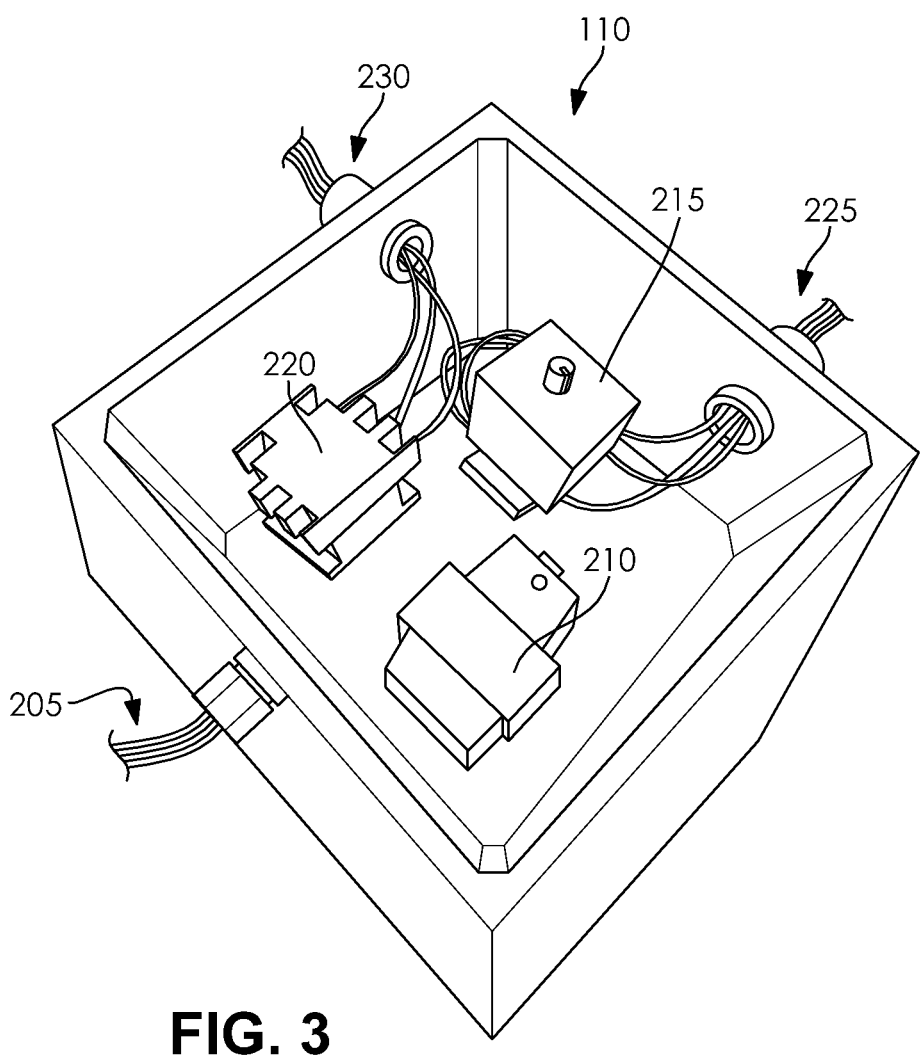
FIG. 3 illustrates a perspective view of an exemplary disclosed system of at least some exemplary embodiments of the present disclosure.

FIG. 3 illustrates a top perspective view of an exemplary disclosed welding electric control 110 that may be configured to conserve welding electric power, reduce welding cost, and/or improve welding safety. Welding electric control 110 may operate based on disconnecting welding equipment power to welding gun 120 when welding gun 120 is idle, and automatically reconnecting power to welding gun 120 when unpowered welding gun 120 is tapped against work piece 125 to be welded, in response to current sensed in magnetic switch 122 magnetically engaged with work piece 125. For example as illustrated in FIG. 3, exemplary disclosed welding electric control 110 may include power input 205 that may be attached to a housing of welding electric control 110 (e.g., via any suitable fastener such as a threaded mechanical fastener). Power input 205 may be connected to an output of welding power supply 115. Welding electric control 110 may also include transformer 210 that may be operably coupled with time delay relay 215, contactor 220, and current sensor input 225, for example as illustrated in FIG. 3, to control (e.g., govern) power supplied to power output 230. Power output 230 may be connected to welding gun 120. In at least some exemplary embodiments, welding electric control 110 may automatically reconnect power to power output 230 when unpowered welding gun 120 that is connected to the power output 230 is tapped against work piece 125 to be welded, causing current to be sensed through current sensor input 225.

The exemplary disclosed system, apparatus, and method may be used in any suitable application for welding. For example, the exemplary disclosed system, apparatus, and method may be used in any suitable application for joining or attaching two weldable materials.

Figure 4:
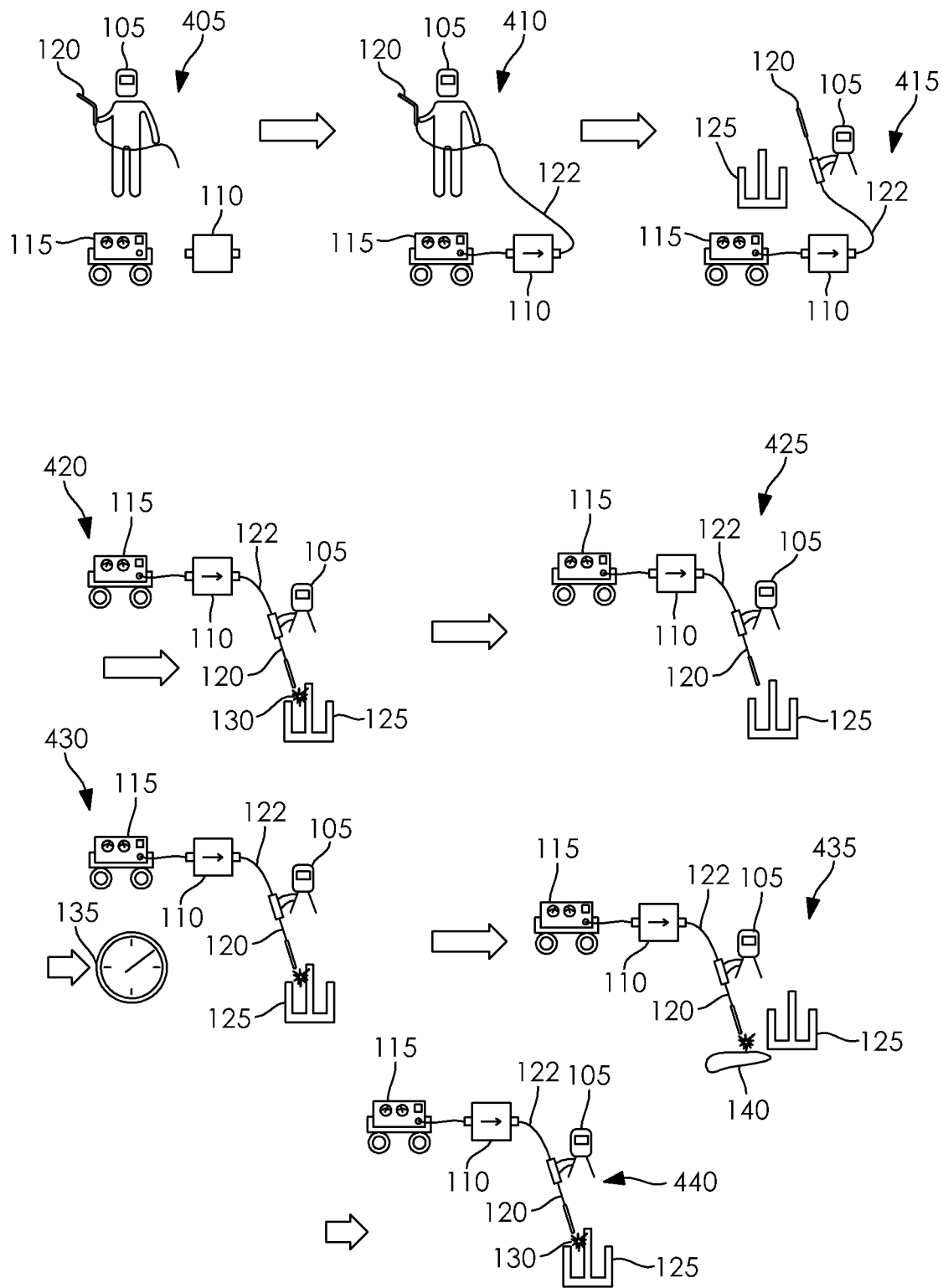
FIG. 4 illustrates an exemplary process of at least some exemplary embodiments of the present disclosure.

FIG. 4 depicts an exemplary process of the exemplary disclosed system and method. In process 400, a welder may conserve welding electric power, reduce welding cost, and/or improve welding safety, using an exemplary welding electric control that may be configured to: disconnect welding equipment power to welding gun 120 when welding gun 120 is idle, and automatically reconnect power to welding gun 120 when unpowered welding gun 120 is tapped against work piece 125 to be welded, in response to current sensed in magnetic switch 122 magnetically engaged with work piece 125. For example as illustrated in FIG. 4, a welder 105 (e.g., a user using welding gun 120) may conserve welding electric power, reduce welding cost, and/or improve welding safety, using welding electric control 110 to control or govern electric power of welding power supply 115 supplied to welding gun 120. Welder 105 may be a human user, a robotic welding system (e.g., robotic welding arm or machine), or any other assembly or user using welding gun 120.

In at least some exemplary embodiments and as illustrated in FIG. 4, welder 105 connects welding power supply 115 electric power output to welding electric control 110 electric power input at steps 405, 410, and 415. As illustrated in FIG. 4, welder 105 also connects welding electric control 110 electric power output to welding gun 120.

In at least some exemplary embodiments and as illustrated in FIG. 4, welding electric control 110 governs electric power output to welding gun 120 in response to current sensed in magnetic switch 122 that may be magnetically engaged with work piece 125 to be welded. For example, welder 105 plans to weld the work piece 125 using the welding gun 120. Also for example, welding gun 120 may be an arc welding gun or any other suitable type of welding gun for example as described herein. In at least some exemplary embodiments, the exemplary disclosed welding equipment may be of any suitable type of welding equipment utilizing electric power.

In at least some exemplary embodiments and as illustrated in FIG. 4, welder 105 activates welding gun 120 generating arc 130 to weld work piece 125 at step 420. For example, welding electric control 110 maintains welding power supply 115 electric power connection to welding gun 120 while welder 105 continues welding. Welding electric control 110 maintains the power connection to welding gun 120 while welder 105 continues welding, as a result of arc 130 current between welding gun 120 and work piece 125 creating a magnetic field that keeps magnetic switch 122 closed. In at least some exemplary embodiments, welder 105 may tap welding gun 120 to a conductive surface (e.g., as described herein), which may cause welding gun 120 to produce arc 130 (e.g., and timer 216 of time delay relay 215 may begin measuring or timing a predetermined period of time 135 as described for example below).

In at least some exemplary embodiments and as illustrated in FIG. 4, welder 105 may deactivate welding gun 120 and stop welding at step 425. When welder 105 stops welding work piece 125, arc 130 current between welding gun 120 and work piece 125 stops. When arc 130 current between welding gun 120 and work piece 125 stops, magnetic switch 122 opens (e.g., magnetic switch moves to an open position), causing welding electric control 110 to disconnect electric power from welding gun 120.

In at least some exemplary embodiments and as illustrated in FIG. 4, predetermined period of time 135 (e.g., as measured by timer 216) after welder 105 starts welding, welding electric control 110 may disconnect welding power supply 115 electric power from welding gun 120 at step 430 if the welder has stopped welding. In one example, predetermined period of time 135 (e.g., of timer 216) may be a variable period of time. In at least some exemplary embodiments, even after predetermined period of time 135 elapses, welding electric control 110 maintains the power connection to welding gun 120 while the welder continues welding, as a result of arc 130 current between welding gun 120 and work piece 125 creating a magnetic field that keeps magnetic switch 122 closed.

In at least some exemplary embodiments and as illustrated in FIG. 4, at some later time at step 435, welder 105 desires to continue welding. For example at step 435, welder 105 taps welding gun 120 against a surface 140 to resume welding. For example, surface 140 may be an electrically conductive surface in electrical contact with work piece 125. For example at step 435, welding electric control 110 reconnects welding power supply 115 electric power to welding gun 120, in response to welder 105 tapping welding gun 120 against surface 140 (e.g., or work piece 125). Also for example, welder 105 may also resume welding by tapping welding gun 120 against work piece 125, for example at step 440. Welder 105 may resume welding based on tapping welding gun 120 to work piece 125 to be welded (e.g., as illustrated at step 440) or to surface 140 (e.g., as illustrated at step 435), causing magnetic switch 122 to close. When magnetic switch 122 closes (e.g., at step 435 or at step 440), welding electric control 110 reconnects power to welding gun 120, and welder 105 may resume using welding gun 120, generating arc 130 to weld work piece 125. Timer 216 may also begin measuring period of time 135 when welder 105 resumes welding and generates arc 130 using welding gun 120.

Although various embodiments have been described with reference to FIGS. 1-4, other embodiments are possible. For example, welding electric control exemplary embodiment designs may save energy, increase safety, and provide metrics for welding manufacturing equipment work. Some embodiment implementations may be referred to as WELDCONE.

In at least some exemplary embodiments, an exemplary WELDCONE implementation may be an electrical control system designed to work with any suitable welding equipment (e.g., stick, tig and all other types of welding equipment) by automatically disconnecting and connecting the power fed to the welding equipment by simply tapping the equipment on any surface.

In at least some exemplary embodiments, the exemplary disclosed welding electric control design may be a stand-alone component that may be attached to any suitable welding machine, thereby providing additional capabilities to that welding machine.

In at least some exemplary embodiments, the exemplary disclosed welding electric control may be used and integrated into future designs of welding machines manufactured and sold worldwide.

In at least some exemplary embodiments, the exemplary disclosed welding electric control may include: a transformer; a contactor; a time delay relay; a magnetic contact; and wiring to connect the components. Using these components with any suitable welding machine may result in a substantial savings of energy (e.g., cost) and increased safety in operating. With any suitable additional computing devices or other similar component, the exemplary disclosed system, apparatus, and method may provide data and/or metrics that may be used to track employee performance, status of equipment, and and/or any other desired metric.

In at least some exemplary embodiments, the exemplary disclosed system, apparatus, and method may involve disconnecting welding equipment power to a welding gun when the welding gun is idle, and automatically reconnecting power to the welding gun when the unpowered welding gun is tapped against a work piece to be welded, in response to current sensed in a magnetic switch magnetically engaged with the work piece. Some exemplary embodiments may provide an electrical control device connected between any suitable welding equipment power supply and a welding gun to be powered by the power supply. In various implementations, the welding gun electric power may be disconnected and reconnected through a contactor controlled by current sensed in a magnetic switch magnetically engaged with the work piece, reducing the welding electric power to zero as a result of permitting substantially complete power disconnection when idle, and automatically reconnecting power when the welding gun is tapped against the work piece to be welded.

In at least some exemplary embodiments, the exemplary disclosed system, apparatus, and method may provide a welding electric power control that may be easily connected to any suitable welding equipment, thereby adapting the welding equipment to have additional capabilities for example as described herein. This facilitation may be a result of providing an embodiment welding electric power control device that may be connected between a welding power supply and a welding gun to be powered by the welding power supply, to automatically control or govern the power supplied to the welding gun. For example, an exemplary embodiment of the welding electric power control device may have one power input connectable to a welding power supply; one power output connectable to a welding gun, to govern the power supplied to the welding gun; and, one control input connected to the welding gun and configured to reconnect the power supply to the welding gun when the welding gun is tapped against a work surface to be welded.

In at least some exemplary embodiments, the exemplary disclosed system, apparatus, and method may provide a welding electric power control that may be integrated into a new welding equipment design. For example, a new welding equipment design may include elements in accordance with the present disclosure, connected between a welding equipment power supply element and a welding gun to be powered by the power supply, to automatically govern the power supplied to the welding gun.

In at least some exemplary embodiments, the exemplary disclosed system, apparatus, and method may improve welding business intelligence. For example, such improved welding business intelligence may be a result of providing welding performance or productivity data captured when the device disconnects and reconnects the welding equipment power in response to welder activity. Exemplary welding performance or productivity data provided by various embodiment implementations may include welding productivity measurements or metrics (e.g., of users such as welders) such as, for example, power off time, power on time, efficiency, or number of welding cycles per unit time, measured based on the device disconnecting and reconnecting welding equipment power in response to welder activity. For example, a technique to measure usage time may be connected to the exemplary disclosed contactor coil (e.g., coil of contactor 220), to facilitate measuring the time a welder uses the welding equipment. Some embodiment welding electric control designs may include one or more embedded computing device programmed and configured to capture, process, analyze, or report such welding performance or productivity data to a data store or management application local to or remote from the welding electric control. For example, an exemplary welding electric control may include an embedded processor and communication link programmed and configured to report welding business intelligence, productivity, and performance data to a cloud-based management server (e.g., server 240 as illustrated in FIG. 2). For example, computing components performing the exemplary operations described above may be integrated into controller 235, server 240, and/or any other suitable cloud-based components. These exemplary disclosed components of system 100 may communicate via any suitable technique such as, for example, the exemplary communication techniques described herein.

In at least some exemplary embodiments, the exemplary disclosed system, apparatus, and method may reduce welding equipment repair parts and maintenance costs. For example, such reduced welding equipment repair parts and maintenance cost may be a result of reduced wear and tear based on reducing the time the welding equipment remains powered, due to automatically disconnecting power when the welding equipment is not welding. In an illustrative example, an industrial manufacturing operation using welding equipment that remains continuously powered (e.g., powered around the clock) as welders on shift work schedules come and go, may save substantial energy and costs employing an embodiment in accordance with the present disclosure to automatically disconnect the welding equipment power and reconnect the power when the next welder arriving on shift taps the welding equipment on a surface Various welding electric power control examples may achieve similar advantages in line with what has been disclosed herein, with implementations configured to operate without a human welder. For example, a robotic welder or automated welding machine may implement separate control circuits or processes for welding motion activation and welding power control. Such an exemplary welding motion activation control circuit or process may be "stateful," e.g., context aware in terms of the state of welding activity. For example, an exemplary automated production line may stop and start welding operation, via welding motion activation control. In this example, when welding is stopped, an embodiment welding electric power control device or process (e.g., for example as described herein) may automatically disconnect power to the welding gun. In this example, when the exemplary automated production line determines, for example, based on programming or configuration, that welding should be restarted, the automated production line may be programmed or configured to use the welding motion activation control to cause the welding gun to tap a work surface, thereby causing the embodiment welding electric power control to automatically reconnect power. In some exemplary embodiments, automatic control of welding electric power may be advantageously extended to multiple interconnected robotic welding units. For example, each of a group of robotic welding units configured to perform diverse synchronized automatic welding operations on a production line may be adapted with an exemplary welding electric power control in accordance with the present disclosure. In an illustrative example, the group of welding electric power control units may be programmed, configured, and interconnected such that power to all of the group of robotic welders may be disconnected a predetermined time after the last robotic welder becomes idle. Some exemplary welding electric power control examples may automatically reconnect power to all members of an embodiment robotic welder group, when one of the robotic welder units taps a work piece. Such a design may improve safety, by separating welding motion activation control of the welding gun movement from the welding equipment power control. For example, in such a design, the welding motion activation control and power control may include separate safety interlocks. Such an exemplary design may reduce risk based on, for example, mitigating or substantially eliminating safety problems that could result from a single point of failure. In an illustrative example, a single point of failure might otherwise exist as a result of, for example, a programming error or sensor failure in a system common to both welding motion activation control and power control.

In at least some exemplary embodiments, the exemplary disclosed system, apparatus, and method may include a welding electric power control comprising: a transformer; a contactor; a time delay relay; and, a magnetic contact, interconnected and configured to disconnect welding equipment power to a welding gun when the welding gun is idle, and automatically reconnect power to the welding gun when the unpowered welding gun is tapped against a surface, in response to current sensed in the magnetic contact magnetically engaged with the work piece. The magnetic contact may be, for example, a magnetic switch. The magnetic switch may be coupled between an exemplary welding electric power control current sense control input and a welding gun. The magnetic switch may be magnetically engaged with a work piece being welded.

In at least some exemplary embodiments, the exemplary disclosed system, apparatus, and method may include welding equipment that may be an arc, stick, tig, or other type of welding equipment. Another aspect of the present disclosure may be an electrical control system integrated with new welding equipment. Some examples may reduce welding electric power cost, based on automatically disconnecting power from the gun when a welder is not welding. Some designs may automatically reconnect power to the welding equipment when the welder taps the equipment on a surface, as a result of a contactor configured to connect the welding equipment power in response to current sensed in the magnetic contact magnetically engaged with the work piece.

In at least some exemplary embodiments, the exemplary disclosed system, apparatus, and method may include a welding electrode that may be electrically connected with the power supply and a work piece by two electrical connections: a connection to an electrical ground, and, a positive electrical connection to the work piece being welded.

In at least some exemplary embodiments, when a user such as a welder has stopped welding and the welding electric control has disconnected the welding gun electric power, the welder may tap the welding gun electrode to a work piece surface to be welded, causing the magnetic switch to close. For example when the magnetic switch closes, the time delay relay reconnects power to the welding gun by energizing the contactor coil.

In at least some exemplary embodiments, the welding electric power control may be provided in a device connectable between a welding power supply and a welding gun to be powered by the power supply, thereby to control (e.g., govern) the electric power supplied to the welding gun.

In at least some exemplary embodiments, the welding electric power control may be provided as integrated with a welding equipment power supply to control (e.g., govern) the electric power supplied to a welding gun connectable to the welding power supply.

In at least some exemplary embodiments, welding electric control may be automated based on a current sensing magnetic switch magnetically engaged with a work piece. Also for example, an operational welding electric control system may be configured to automatically control welding electric power based on magnetically engaging a current sensing magnetic switch with a work piece to be welded.

In at least some exemplary embodiments, the exemplary disclosed apparatus may include a power supply (e.g., welding power supply 115), a control device (e.g., welding electric control 110) connected to the power supply, a welding device (e.g., welding gun 120) selectively connected to the power supply via the control device, and a switch (e.g., switch 122) connected between the control device and the welding device. The control device may include a time delay relay that measures a predetermined time period. The switch may maintain a closed position when the predetermined time period expires and the welding device is producing a welding arc. The switch may switch from the closed position to an open position when the predetermined time period expires and the welding device stops producing the welding arc. The control device may transfer current from the power supply to the welding device when the switch is closed, and may block current from the power supply to the welding device when the switch is in the open position. The switch may be a magnetic switch. The switch may maintain the closed position: when the predetermined time period is unexpired; or when the welding device is producing the welding arc when the predetermined time period expires and the welding device continues to produce the welding arc without interruption following the expiration of the time period. The switch may switch from the closed position to the open position: when the predetermined time period expires and the welding device has stopped producing the welding arc; or when the welding device has continuously produced the welding arc following the expiration of the time period and then the welding device stops producing the welding arc for the first time following the expiration of the time period. The switch may switch from the open position to the closed position when a user taps the welding device to a conductive surface. The time delay relay may include a timer that starts the predetermined time period when the user taps the welding device to the conductive surface. The control device may include a contactor having a coil that is selectively energized by the switch. When the switch is in the closed position, the switch may transfer current to the coil, which actuates the contactor to electrically connect the power supply to the welding device. When the switch is in the open position, the coil may remain unenergized and the contactor electrically disconnects the power supply from the welding device. The exemplary disclosed may further include a first electrical connector electrically connecting the power supply to a power input of the control device, a second electrical connector disposed in the control device and connecting the power input to the contactor that is electrically connected to a power output of the control device, a third electrical connector electrically connecting the power output to the welding device, and a fourth electrical connector electrically connecting the welding device to the time delay relay. The time delay relay may be electrically connected to the contactor, and the switch may be disposed on the fourth electrical connector. The control device may be electrically connected between the power supply and the welding device, and the time delay relay may be electrically connected between the switch and the contactor. The exemplary disclosed apparatus may further include a network server that communicates with a controller of the control device, wherein the controller transfers data to the network server.

In at least some exemplary embodiments, the exemplary disclosed method may include providing a power supply (e.g., welding power supply 115) and a welding device (e.g., welding gun 120), disposing a control device (e.g., welding electric control 110) electrically between the power supply and the welding device, disposing a switch (e.g., switch 122) between the control device and the welding device, measuring a predetermined time period with the control device, and maintaining the switch in a closed position when the predetermined time period expires and the welding device is producing a welding arc. The exemplary disclosed method may also include switching the switch from the closed position to an open position when the predetermined time period expires and the welding device stops producing the welding arc, transferring current from the power supply to the welding device, via the control device, when the switch is closed, and blocking current from the power supply to the welding device, via the control device, when the switch is in the open position. The exemplary disclosed method may further include maintaining the closed position when the predetermined time period is unexpired, or maintaining the closed position when the welding device is producing the welding arc when the predetermined time period expires and the welding device continues to produce the welding arc without interruption following the expiration of the time period. The exemplary disclosed method may additionally include switching the switch from the closed position to the open position: when the predetermined time period expires and the welding device has stopped producing the welding arc, or when the welding device has continuously produced the welding arc following the expiration of the time period and then the welding device stops producing the welding arc for the first time following the expiration of the time period. The exemplary disclosed method may also include switching the switch from the open position to the closed position when a user taps the welding device to a conductive surface, and starting a timing of the predetermined time period when the user taps the welding device to the conductive surface. The exemplary disclosed method may further include transferring current from the switch to a contactor of the control device, and actuating the contactor to electrically connect the power supply to the welding device, when the switch is in the closed position, and maintaining a coil of the contactor in an unenergized state, which electrically disconnects the power supply from the welding device, when the switch is in the open position.

In at least some exemplary embodiments, the exemplary disclosed apparatus may include a power supply (e.g., welding power supply 115), a control device (e.g., welding electric control 110) having a power input that is connected to the power supply via a first electrical connector, a welding device (e.g., welding gun 120) selectively connected to the power supply via a second electrical connector of the control device, the second electrical connector connecting the power input to a contactor of the control device that is electrically connected to a power output of the control device, a magnetic switch connected between the control device and the welding device, a third electrical connector electrically connecting the power output to the welding device, and a fourth electrical connector electrically connecting the welding device to a time delay relay of the control device that measures a predetermined time period. The magnetic switch may maintain a closed position when the predetermined time period expires and the welding device is producing a welding arc. The magnetic switch may switch from the closed position to an open position when the predetermined time period expires and the welding device stops producing the welding arc. The control device may transfer current from the power supply to the welding device when the magnetic switch is in the closed position, and blocks current from the power supply to the welding device when the magnetic switch is in the open position. The time delay relay may be electrically connected to the contactor. The magnetic switch may be disposed on the fourth electrical connector. The control device may be electrically connected between the power supply and the welding device. The time delay relay may be electrically connected between the magnetic switch and the contactor. The welding device producing the welding arc may create a magnetic field that closes the magnetic switch. When the welding device stops producing the welding arc, then the magnetic field stops and the magnetic switch may move from the closed position to the open position when the predetermined time period is expired.

The exemplary disclosed system, apparatus, and method may reduce a cost to operate welding equipment, for example by automatically disconnecting power fed to the welding equipment when the welding equipment is not welding. The exemplary disclosed system, apparatus, and method may reduce effort and burden on a welder in operating welding equipment for example by automatically reconnecting power fed to the welding equipment when the welder taps the equipment on a surface. The exemplary disclosed system, apparatus, and method may further improve welding safety, for example by reducing a risk of fire or electric shock risk by automatically disconnecting power to idle welding equipment.

The details of various embodiments are set forth in the accompanying drawings and the description. Other features and advantages will be apparent from the description and drawings, and from the claims.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;" or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation, and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed embodiment. Thus, the claims following this Detailed Description are hereby expressly incorporated into this Detailed Description, with each claim standing on its own as a separate embodiment. This disclosure is intended to be interpreted as including all permutations of the independent claims with their dependent claims.

According to an embodiment of the present invention, the system and method may be accomplished through the use of one or more computing devices. One of ordinary skill in the art would appreciate that an exemplary system appropriate for use with embodiments in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers, or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a sequence of computational instructions or program instructions. It will be appreciated that a programmable apparatus (i.e., computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable, and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An apparatus, comprising:
   a power supply;
   a control device connected to the power supply;
   a welding device selectively connected to the power supply via a contactor of the control device; and
   a switch connected between a time delay relay of the control device and the welding device;
   wherein the time delay relay measures a predetermined time period, the predetermined time period being initiated in response to a welding arc that is produced by the welding device when the welding device is tapped to a conductive surface by a user;
   wherein the time delay relay is connected to the contactor that selectively connects the welding device to the power supply;
   wherein the switch maintains a closed position when the predetermined time period has expired and the welding device continues producing the welding arc;
   wherein the switch switches from the closed position to an open position when both the predetermined time period has expired and the welding device stops producing the welding arc; and
   wherein the control device transfers current from the power supply to the welding device when the switch is in the closed position, and blocks current from the power supply to the welding device when the switch is in the open position.

2. The apparatus of claim 1, wherein the switch is a magnetic switch.

3. The apparatus of claim 1, wherein the switch maintains the closed position:
   when the predetermined time period is unexpired; or
   when the welding device is producing the welding arc when the predetermined time period expires and the welding device continues to produce the welding arc without interruption following the expiration of the time period.

4. The apparatus of claim 1, wherein the switch switches from the closed position to the open position:
   when the predetermined time period expires and the welding device has stopped producing the welding arc; or
   when the welding device has continuously produced the welding arc following the expiration of the time period and then the welding device stops producing the welding arc for the first time following the expiration of the time period.

5. The apparatus of claim 1, wherein the switch switches from the open position to the closed position when the user taps the welding device to the conductive surface.

6. The apparatus of claim 5, wherein the time delay relay includes a timer that starts the predetermined time period when the user taps the welding device to the conductive surface.

7. The apparatus of claim 1, wherein the contactor has a coil that is selectively energized by the switch.

8. The apparatus of claim 7, wherein:
   when the switch is in the closed position, the switch transfers current to the coil, which actuates the contactor to electrically connect the power supply to the welding device; and
   when the switch is in the open position, the coil remains unenergized and the contactor electrically disconnects the power supply from the welding device.

9. The apparatus of claim 7, further comprising:
   a first electrical connector electrically connecting the power supply to a power input of the control device;
   a second electrical connector disposed in the control device and connecting the power input to the contactor that is electrically connected to a power output of the control device;
   a third electrical connector electrically connecting the power output to the welding device; and
   a fourth electrical connector electrically connecting the welding device to the time delay relay.

10. The apparatus of claim 9, wherein the switch is disposed on the fourth electrical connector.

11. The apparatus of claim 9, wherein:
    the control device is electrically connected between the power supply and the welding device; and
    the time delay relay is electrically connected between the switch and the contactor.

12. The apparatus of claim 1, further comprising a network server that communicates with a controller of the control device;
    wherein the controller transfers data to the network server.

13. A method, comprising:
    providing a power supply and a welding device;
    disposing a control device electrically between the power supply and the welding device, the welding device selectively connected to the power supply via a contactor of the control device;
    disposing a switch between a time delay relay of the control device and the welding device;
    measuring a predetermined time period with the time delay relay of the control device, wherein the predetermined time period is initiated in response to a welding arc that is produced by the welding device when the welding device is tapped to a conductive surface by a user;

connecting the time delay relay to the contactor that selectively connects the welding device to the power supply;

maintaining the switch in a closed position when the predetermined time period has expired and the welding device continues producing the welding arc;

switching the switch from the closed position to an open position when both the predetermined time period has expired and the welding device stops producing the welding arc;

transferring current from the power supply to the welding device, via the control device, when the switch is closed; and blocking current from the power supply to the welding device, via the control device, when the switch is in the open position.

14. The method of claim 13, further comprising maintaining the closed position:
when the predetermined time period is unexpired; or
when the welding device is producing the welding arc when the predetermined time period expires and the welding device continues to produce the welding arc without interruption following the expiration of the time period.

15. The method of claim 13, further comprising switching the switch from the closed position to the open position:
when the predetermined time period expires and the welding device has stopped producing the welding arc; or
when the welding device has continuously produced the welding arc following the expiration of the time period and then the welding device stops producing the welding arc for the first time following the expiration of the time period.

16. The method of claim 13, further comprising:
switching the switch from the open position to the closed position when the user taps the welding device to the conductive surface; and
starting a timing of the predetermined time period when the user taps the welding device to the conductive surface.

17. The method of claim 13, further comprising:
transferring current from the switch to the contactor of the control device, and actuating the contactor to electrically connect the power supply to the welding device, when the switch is in the closed position; and
maintaining a coil of the contactor in an unenergized state, which electrically disconnects the power supply from the welding device, when the switch is in the open position.

18. An apparatus, comprising:
a power supply;
a control device having a power input that is connected to the power supply via a first electrical connector;
a welding device selectively connected to the power supply via a second electrical connector of the control device, the second electrical connector connecting the power input to a contactor of the control device that is electrically connected to a power output of the control device;
a magnetic switch connected between a time delay relay of the control device and the welding device, the time delay relay measuring a predetermined time period and the predetermined time period being initiated in response to a welding arc that is produced by the welding device when the welding device is tapped to a conductive surface by a user;
a third electrical connector electrically connecting the power output to the welding device; and
a fourth electrical connector electrically connecting the welding device to the time delay relay of the control device;
wherein the time delay relay is electrically connected to the contactor;
wherein the magnetic switch maintains a closed position when the predetermined time period has expired and the welding device continues producing the welding arc;
wherein the magnetic switch switches from the closed position to an open position when both the predetermined time period has expired and the welding device stops producing the welding arc; and
wherein the control device transfers current from the power supply to the welding device when the magnetic switch is in the closed position, and blocks current from the power supply to the welding device when the magnetic switch is in the open position.

19. The apparatus of claim 18, wherein:
the magnetic switch is disposed on the fourth electrical connector;
the control device is electrically connected between the power supply and the welding device; and
the time delay relay is electrically connected between the magnetic switch and the contactor.

20. The apparatus of claim 18, wherein:
the welding device producing the welding arc creates a magnetic field that closes the magnetic switch; and
when the welding device stops producing the welding arc, then the magnetic field stops and the magnetic switch moves from the closed position to the open position when the predetermined time period is expired.

* * * * *